Oct. 28, 1924.

E. D. CHURCH 1,513,532

BRAKE MECHANISM FOR INTERMITTENTLY MOVING PLATENS

Filed Jan. 11, 1924    2 Sheets-Sheet 1

Inventor
Edgar D. Church

By Geo. B. Willcox
Attorney

Oct. 28, 1924.

1,513,532

E. D. CHURCH

BRAKE MECHANISM FOR INTERMITTENTLY MOVING PLATENS

Filed Jan. 11, 1924  2 Sheets-Sheet 2

Edgar D. Church, Inventor

By Geo. B. Willcox, Attorney

Patented Oct. 28, 1924.

1,513,532

UNITED STATES PATENT OFFICE.

EDGAR D. CHURCH, OF SAGINAW, MICHIGAN, ASSIGNOR TO JACKSON & CHURCH CO., OF SAGINAW, MICHIGAN, A CORPORATION OF MICHIGAN.

BRAKE MECHANISM FOR INTERMITTENTLY-MOVING PLATENS.

Application filed January 11, 1924. Serial No. 685,656.

*To all whom it may concern:*

Be it known that I, EDGAR D. CHURCH, a citizen of the United States, residing at Saginaw, in the county of Saginaw and State of Michigan, have invented certain new and useful Improvements in Brake Mechanism for Intermittently - Moving Platens; and I do hereby declare the following to be a full, clear, and exact description of the invention, such as will enable others skilled in the art to which it appertains to make and use the same.

This invention relates to sand lime brick machines and the like wherein a platen is employed containing die pockets in which the bricks are pressed, the platen being given an intermittent step by step rotary movement to bring the die pockets successively into register with the pressing mechanism.

My invention pertains more particularly to an improved construction of the brake mechanism by which the platen is brought to rest as each pocket comes to its working position and by which the brake is released.

The objects of my invention are to increase the braking force, to reduce wear on the friction surfaces of the brake, to reduce the cost of manufacture and to provide a reliable means of applying a predetermined brake resistance to the periphery of the platen whereby the same pressure is applied each time regardless of increasing play in the working parts caused by wear.

I further provide means for varying and adjusting the pressure applied by the brake to the platen.

In revolvable platen presses of the kind to which my invention is applicable it is important for fast rate of output that the platen be stopped quickly and accurately at each operation and that it be promptly released by the brake. The platen of the machine is very heavy, its inertia and momentum are great, and the air in which it works is usually laden with dust so that the operation of a brake shoe as ordinarily applied by the pressure of a tightening cam, soon becomes unreliable and frequent repairs and adjustments are necessary.

In my present construction I apply the brake not by cam action, but by a spring or its equivalent, thereby producing the same effective pressure on the brake at each operation of the press. The brake operating spring is adjustable, so that the proper braking effort to absorb the momentum of the platen may be applied at each operation over a long working period, even though the brake surface become worn or dust accumulates under the brake surface to such an extent as to interfere with the proper operation of a direct acting cam.

In my improvement the cam is made to release the brake instead of applying it. Consequently wear on the cam lever bearings or on the cam itself will not affect the brake operation, because the force applied to the brake, being produced by a heavy compression spring or its equivalent, is always uniform, or by a simple adjustment can be easily corrected.

With the foregoing and certain other objects in view which will appear later in the specifications, my invention comprises the devices described and claimed and the equivalents thereof.

Figure 1:
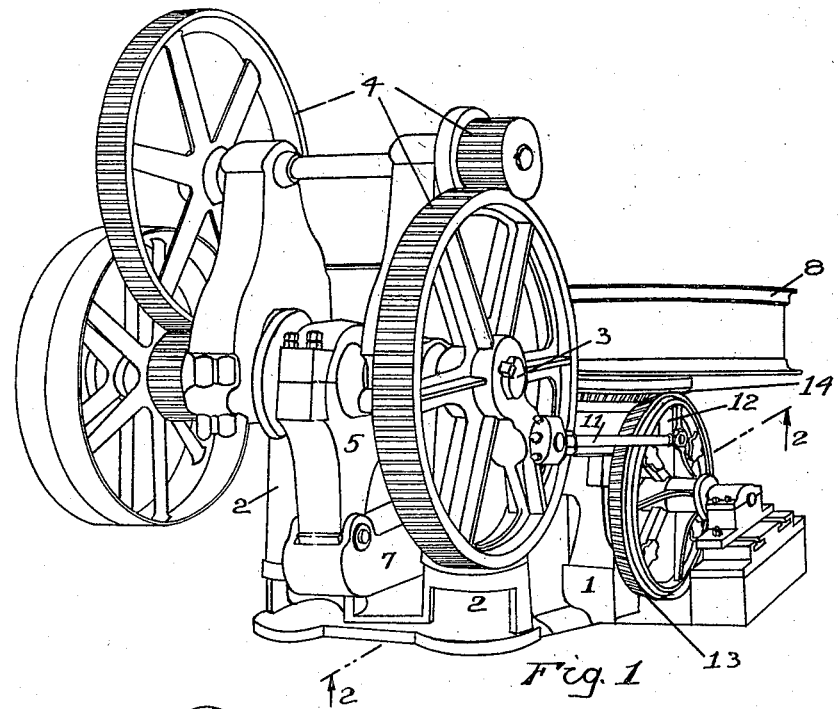
Fig. 1 is a perspective view, from the rear, of a sand lime brick machine embodying my improvement.
Figure 2:
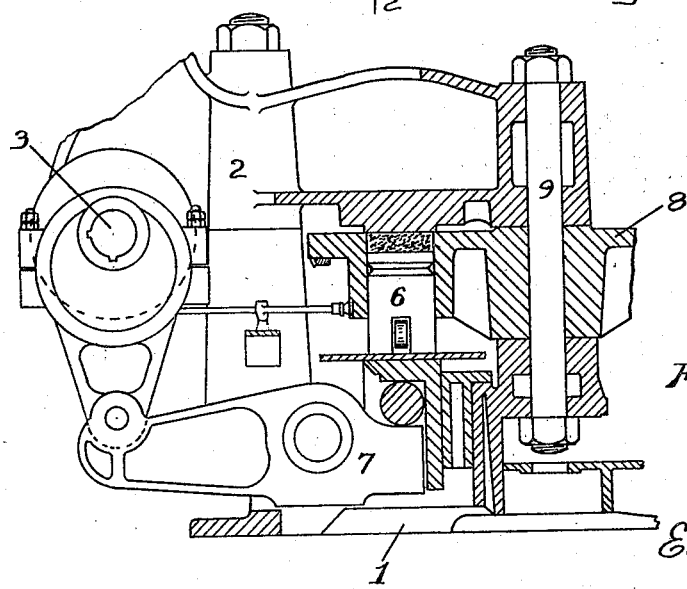
Fig. 2 is a partly broken vertical section, on the line 2—2 of Fig. 1.

In the drawings, 1 indicates the frame of a brick machine having columns 2, 2 that support the main drive shaft bearings and the brake mechanism, which latter forms the subject of my present improvement. 3 is the main drive shaft actuated by suitable gearing 4 and carrying the eccentric 5 that actuates the brick plungers 6 through the plunger lever 7, there being one operation of the plunger up and down to each revolution of drive shaft 3 and its eccentric 5.

8 is the intermittently movable platen which is made to revolve about its pintle 9 with a step by step movement to bring the brick molds 10 successively into position so that the plungers 6 can be actuated at the right time by lever 7.

The step by step movement of platen 8 is preferably produced by means of the connecting rod 11, one end of which is journaled to a gear on the drive shaft 3, the other end journaled to an oscillating spider 12 which, by means of suitable latches intermittently rotates a bevel gear 13. This gear imparts its intermittent movement to platen 8 by means of a bevel gear 14 secured to the platen. The construction and mode of operation of this intermittent movement device is shown and described in my copending application, Serial No. 559,930.

The mechanism thus far referred to is that of the usual sand lime brick press, to which my present improvement is applied.

Proper comprehension of the purpose of my invention as applied to sand lime brick presses necessities taking notice of the fact that the continuous rotation of drive shaft 3 in such a press produces periodic operation of successive plungers 6 through eccentric 5 and lever 7, and that rotation of shaft 3 simultaneously produces intermittent progressive step-by-step rotation of platen 8 through the connecting rod 11, spider 12 and gears 13 and 14.

It will also be seen that if platen 8 could always be stopped at exactly the right points in its rotation to properly register the plungers and pockets, no further mechanism would be required for a properly operating brick press.

It has been found in practice, however, that the heavy platen 8, by reason of its momentum when a forward movement is imparted to it, is difficult to stop at exactly the right point and consequently various types of automatically operated brakes have been produced to accomplish this result, but with only partial success.

Heretofore I have employed shoe or block brakes of various kinds, in which the braking force has been applied by means of cams actuated from the main shaft 3. But I have found that such devices do not always apply the same amount of braking pressure, especially after the parts have become somewhat worn. Consequently frequent adjustments and renewals have been required.

To avoid these difficulties and to produce a brake that can be depended upon over a long period of time to produce accurate braking of the platen 8 I have devised the brake shown herein, which will now be described.

15 is a band brake applied to the periphery of platen 8. One end of the band, as 16, may be secured to one of the posts 2, as shown in Fig. 5, or to one member of an L-lever 17, which is pivoted, as at 18, to a bar 19 carried by the posts 2, 2.

Figure 3:
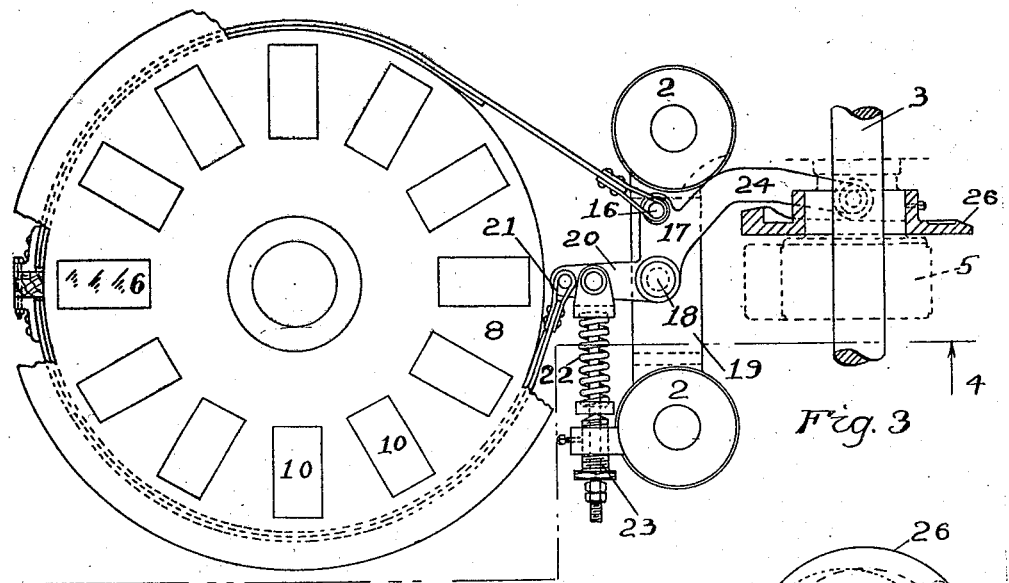
Fig. 3 is a top plan view of the improved brake mechanism.
Figure 4:
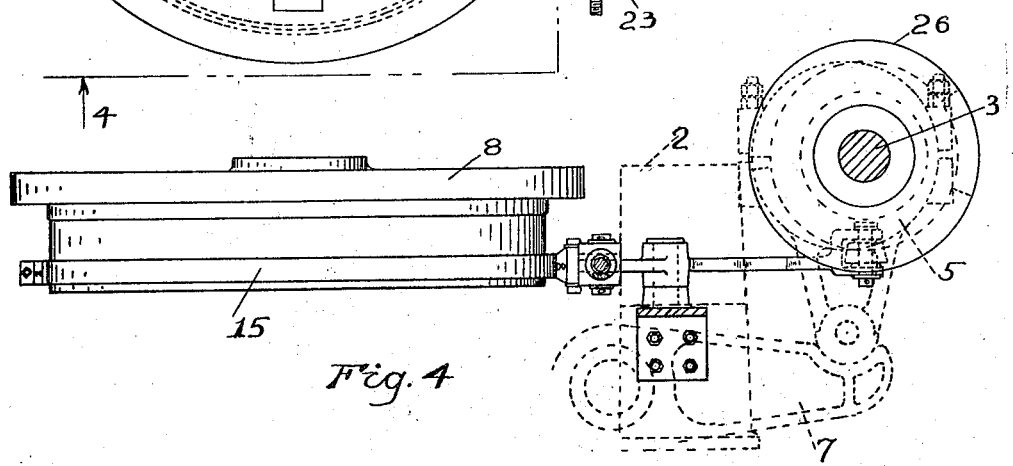
Fig. 4 is a part sectional side view of the parts shown in Fig. 3, the section being taken on line 4—4 of Fig. 3.
Figure 5:
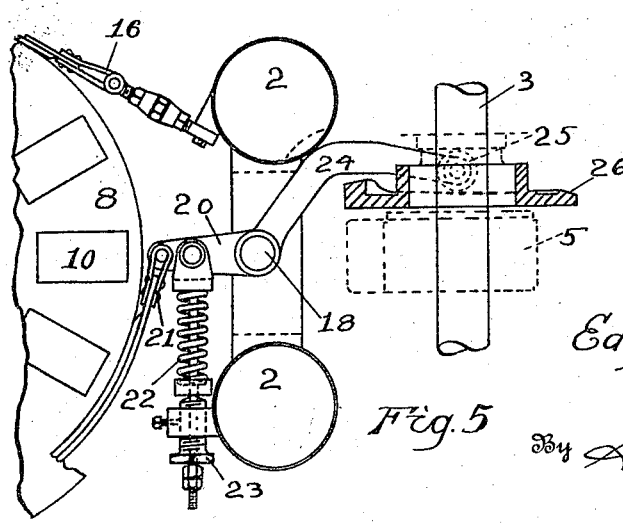
Fig. 5 is a detail showing a modified arrangement of the brake.

To the free end 20 of the L-lever is pivoted the other end 21 of the band brake and a compression spring 22 is applied to the free end of the L-lever 20 intermediate its ends, the other end of the spring being seated on one of the columns 2, as shown in Figs. 3 and 5. The spring 22 may be provided with a suitable screw adjustment 23 for varying its tension. The L-lever has an arm 24 on the end of which is roller 25 that rides upon the working face of a cam 26 fixed to the main shaft 3. At each revolution of the shaft 3 during which the operation of the plunger and the intermittent movement of platen 8 is accomplished, as previously described, the spring 22 is first compressed by the action of cam 26 and arm 24, thereby releasing the brake bands; and at the proper time, determined by the shape of the cam 26, arm 24 is released and spring 22 exerts its compressive force to tighten the brake band.

The cam 26 is employed not for the purpose of applying the brake to platen 8, as heretofore, but for the purpose of releasing it, the application of the braking pressure being produced at each operation of the machine by the compressive force of spring 22, this force being practically a constant one. The amount of braking effort on platen 8 is always the same and when properly adjusted will absorb the entire momentum of platen 8 at exactly the right time to synchronize with the other operations of the press.

To adjust the spring 22 it is only necessary to increase or decrease its compression by the adjusting screws 23 or their equivalents.

Having thus described my invention, what I claim and desire to secure by Letters Patent is:

1. In a brick press including a revolvable main shaft and a revolvable platen operatively connected, a brake band on the rim of the platen, a lever pivoted at one end to a fixed support and pivotally secured at its other end to one end of said brake band, a spring normally applying pressure to said lever tending to set said brake band, and a cam adapted to engage said lever to compress said spring and thereby release the brake, said cam mounted on said main shaft.

2. In a brick press including an intermittently revolvable platen, a brake band on the rim of said platen, a lever pivotally secured to an end of said brake band, a spring normally applying pressure to said lever tending to set said brake band, a device for varying the pressure of said spring, and means adapted to compress said spring and thereby release said brake at each operation of said press.

In testimony whereof I affix my signature in presence of two witnesses.

EDGAR D. CHURCH.